United States Patent [19]

Inaba et al.

[11] Patent Number: 4,753,276
[45] Date of Patent: Jun. 28, 1988

[54] METHOD AND APPARATUS FOR INJECTING LIQUID INTO DISPLAY DEVICE CELL

[75] Inventors: Hiroshi Inaba, Matsusaka; Kiyoshi Nakase, Mie; Yukitoshi Yanagida, Matsusaka, all of Japan

[73] Assignee: Central Glass Company, Limited, Obe, Japan

[21] Appl. No.: 51,409

[22] Filed: May 19, 1987

[51] Int. Cl.$^4$ ............................................. B65B 31/02
[52] U.S. Cl. ........................................... 141/7; 141/59
[58] Field of Search .................... 141/5, 7, 59, 63, 65

[56] References Cited

U.S. PATENT DOCUMENTS

| | | | |
|---|---|---|---|
| 2,740,570 | 4/1956 | Breadner et al. | 141/65 X |
| 2,855,006 | 10/1958 | Geisler | 141/7 |
| 4,228,832 | 10/1980 | Brown | 141/59 X |
| 4,662,410 | 5/1987 | Hatanaka | 141/65 |

FOREIGN PATENT DOCUMENTS

| | | | |
|---|---|---|---|
| 573492 | 6/1924 | France | 141/65 |
| 48-77851 | 10/1973 | Japan . | |
| 7015 | 1/1977 | Japan | 141/7 |
| 55-111919 | 8/1980 | Japan . | |
| 57-129418 | 8/1982 | Japan . | |
| 58-108431 | 7/1983 | Japan . | |
| 59-34285 | 8/1984 | Japan . | |
| 1024217 | 3/1966 | United Kingdom | 141/63 |

Primary Examiner—Mark J. Thronson
Attorney, Agent, or Firm—Fleit, Jacobson, Cohn & Price

[57] ABSTRACT

Injection of a functional liquid into a display device cell having an inlet opening and a relatively narrow space between front and back substrates. The liquid is a liquid crystal for a liquid crystal display device or an electrolyte solution for an electrochromic device. The cell is placed in a chamber such that the inlet opening is in an uppermost section of the cell. Also a vessel containing the liquid is placed in the chamber, and vacuum is created in the chamber. In that state the inlet opening of the cell is connected to the liquid in the vessel by a pipe. After that the lever of the liquid surface in the vessel is suitably varied with respect to the level of the inlet opening of the cell by vertically moving the vessel containing the liquid and/or the cell, while an inactive gas is gradually introduced into the chamber to produce a controlled pressure difference between the interior of the cell and the inactive gas atmosphere in the chamber. By this method the injection of the liquid is accomplished easily and efficiently without producing bubbles in the display device cell and without distorting the planar and parallel substrates of the cell.

7 Claims, 1 Drawing Sheet

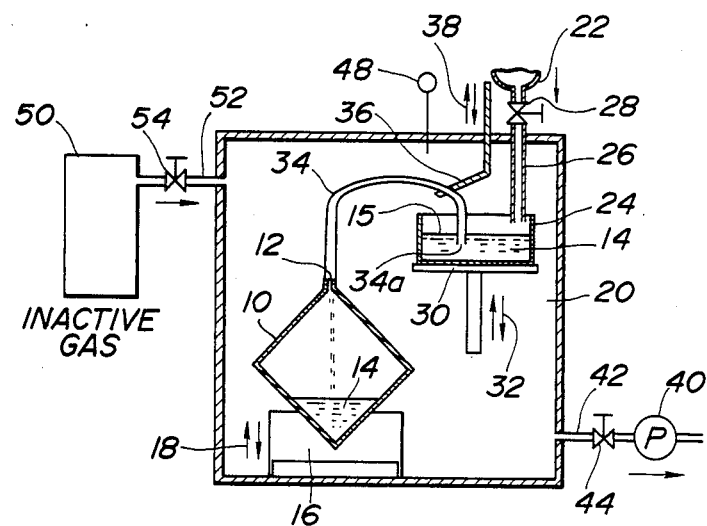

METHOD AND APPARATUS FOR INJECTING LIQUID INTO DISPLAY DEVICE CELL

BACKGROUND OF THE INVENTION

This invention relates to a method for injecting a functional liquid such as a liquid crystal or an electrolyte solution into a display device cell having a relatively narrow space between two planar substrates held opposite to each other and to an apparatus for the same.

In producing a liquid crystal display device or an electrochromic display device, an indispensable and troublesome operation is injecting a liquid crystal or an electrolyte solution into the display device cell so as to fill the narrow space between the front and back substrates of the cell with the liquid crystal or the electrolyte solution. Several ways have been proposed for facilitation of this operation.

According to JP-A No. 48-77851, for instance, pressurized liquid crystal is forced into the display device cell by an inlet opening while another opening of the cell is used to discharge air and excess liquid crystal from the cell. However, this method is liable to leave bubbles at the interface between the liquid crystal and either of the front and back substrates of the cell. Besides, the provision of the two openings in the cell augments the probability of leakage of the liquid crystal or appearance of bubbles in the cell with the lapse of time. According to JP-UM-A No. 58-108431, for instance, vacuum is created in a display device cell to take in liquid crystal by utilizing a pressure difference. However, when this technique is applied to a large-sized cell a high vacuum has to be created in the cell so that the cell substrates are liable to be concavely distorted and may possibly be broken in the cases of glass substrates. Besides, it is likely that air is sucked in the cell at the time of sealing the inlet opening of the cell after taking in the liquid crystal. According to JP No. 59-34285 for instance, in producing a relatively large-sized liquid crystal display device liquid crystal is injected into the display device cell while the spacing between the front and back substrates of the cell is kept widened by disposing a spacer between the two substrates. This method is complicated and inconvenient for practical manufacturing.

According to JP-A No. 55-111919 for instance, an electrolyte solution is injected into an electrochromic display device cell by using a three-way manifold to evacuate the cell and then introduce the electrolyte solution into the cell. JP-A No. 57-129418 shows an apparatus for injecting an electrolyte solution into the cell of an electrochromic display device, including a vacuum chamber in which the cell is placed, a solution injection pipe which passes through a wall of the vacuum chamber and is held slidably movably and a pipe which is connected to the injection pipe at a section outside the vacuum chamber and extends to a vessel to receive a waste portion of the solution. These vacuum type methods and apparatus for electrochromic display device cells are still unsatisfactory from a practical point of view for several reasons including complexity of apparatus and operation and distortion of the cell substrates.

SUMMARY OF THE INVENTION

It is an object of the present invention to provide a method for injecting either a liquid crystal or an electrolyte solution into a display device cell easily and efficiently and without distorting the cell substrates or producing bubbles in the liquid taken into the cell.

It is another object of the invention to provide an apparatus for performing a liquid injecting method according to the invention.

According to the present invention the above objects are accomplished by placing a display device cell having an inlet opening and a vessel containing a liquid to be injected into the cell in a chamber, creating vacuum in the chamber and also in the display device cell, then connecting the inlet opening of the cell to the liquid in the vessel by a tube, and suitably varying the level of the liquid surface in the vessel with respect to the level of the inlet opening of the cell and gradually raising the pressure in the chamber by introducing an inactive gas into the chamber at a suitable rate.

More definitely, this invention provides a method of injecting a liquid into a display device cell having an inlet opening, the method comprising the steps of (a) connecting one end of a tube to the inlet opening of the cell and placing a vessel containing the liquid and the display device cell in a chamber such that the inlet opening is in an uppermost section of the cell while the other end of the tube is left open to the atmosphere in the chamber, (b) replacing the air in the chamber by an inactive gas and thereafter purging the inactive gas from the chamber to thereby create vacuum in the chamber and also in the cell, and (c) after step (b) submerging said other end of the tube in the liquid in the vessel and desirably varying the level of the surface of the liquid in the vessel with respect to the level of the inlet opening of the cell and introducing an inactive gas into the chamber while controlling the rate of a rise in the gas pressure in the chamber up to the atmospheric pressure to thereby control the rate of injection of the liquid into the cell through the tube.

At step (c) of this method, the vessel containing the liquid and/or the display device cell are moved upward and/or downward with respect to each other, and also the aforementioned tube is moved upward and/or downward so as to keep the free end of the tube submerged in the liquid in the vessel.

After filling the space in the display device cell with the liquid by the steps (a) to (c) the tube is detached from the cell, and the inlet opening is closed and sealed in a known manner.

An apparatus according to the invention comprises a chamber provided with a gas purging means, an inactive gas introducing means and a liquid supplying means, a rest which is disposed in the chamber and on which the display device cell can be placed in such a posture that the inlet opening is in an uppermost section of the cell, a support of the vessel for the liquid disposed in the chamber, means for moving the support upward and downward, a tube which is to be connected at its one end to the inlet opening of the cell and can be submerged at the other end in the liquid in the vessel and means for holding the tube and moving the tube upward and downward.

Preferably the apparatus includes means for moving the rest on which the cell is placed upward and downward.

This invention is applicable to either a liquid crystal display device cell or an electrochromic display device cell, and it is possible to inject the liquid into a plurality of cells simultaneously.

As to the display device cell which is to be filled with a liquid by the method according to the invention, it suffices to provide a single inlet opening in a side wall of the cell. There is no need of boring a hole in the front or back substrate of the cell. In the present invention the injection of the liquid into the display device cell can be accomplished by using a relatively low vacuum since an inactive gas pressure is used at the same time. The rate of injection of the liquid into the cell can be arbitrarily controlled by controlling the head of the liquid, the magnitude of pressure difference between the interior of the cell and the inactive gas atmosphere in the chamber, and the magnitude of the inactive gas pressure acting on the liquid surface in the chamber. Therefore, it is possible to control the degree of concaving or bulging of the cell substrates during the liquid injecting operation and it is easy to accomplish the injection of the liquid without impairing uniformity of the distance between the front and back substrates even when the cell has a very wide display area and without leaving or producing bubbles in the cell filled with the liquid. That is, the display device produced by using the liquid injecting method according to the invention is excellent in quality and high in reliability and durability. Besides, the injection of the liquid can be accomplished in a relatively short time, and sealing of the inlet opening after the liquid injecting operation can be done easily and quickly without encountering any particular problem.

BRIEF DESCRIPTION OF THE DRAWING

The single FIGURE is a schematic illustration of a liquid injection apparatus according to the invention in an elevational sectional view.

DESCRIPTION OF THE PREFERRED EMBODIMENTS

The FIGURE shows an example of liquid injection apparatus according to the invention for filling a display device cell 10 with a functional liquid 14 such as a liquid crystal or an electrolyte solution. The apparatus has a chamber 20 in which the display device cell 10 is placed on a rest 16. The liquid 14 is supplied from a tank 22 located outside the chamber 20 to a vessel 24 disposed in the chamber 20 through a pipe 26 provided with a valve 28, and a tube 34 held by a hook 36 is used to inject the liquid 14 in the vessel 24 into the cell 10 by an inlet opening 12. The inlet opening 12 is provided in the side wall of the cell 10 at or near a corner of the rectangular cell 10, and the cell 10 is held in such a posture that the inlet opening 12 is in the uppermost section of the cell 10. The rest 16 on which the cell 10 is placed can be moved upward and downward by means of a lift mechanism represented by arrows 18.

The vessel 24 for the liquid 14 is placed on a support 30 which can be moved upward and downward by means of a lift mechanism represented by arrows 32. The hook 36 holding the tube 34 too can be moved upward and downward by means of a lift mechanism represented by arrows 38.

The chamber 20 is connected to a vacuum pump 40 by a pipe 42 provided with a valve 44. Numeral 48 indicates a vacuum gauge. Furthermore, the chamber 20 is connected to an inactive gas reservoir 50 by a pipe 52 provided with a valve 54.

EXAMPLE

Using the above described apparatus, an electrolyte solution 14 was injected into an electrochromic display device (ECD) cell 10, which was about 400 mm×400 mm in widths and 1 mm in spacing between the front and back substrates of glass. The tube 34 connected to the inlet opening 12 of the ECD cell 10 was made of silicone and had an outer diameter of about 12 mm and an inner diameter of about 3 mm. The capacity of the lift mechanism 32 was such that the level of the liquid surface 15 in the vessel 24 could be raised up to 150 mm above the level of the inlet opening 12 of the cell 10 and lowered down to 150 mm below the level of the inlet opening 12.

The ECD cell 10 was placed in the chamber 20 in the aforementioned posture. A sufficient quantity of the electrolyte solution 14 was poured into the vessel 24, and the support 30 was lowered so as to keep the liquid surface 15 in the vessel 24 slightly lower than the level of the inlet opening 12 of the cell 10. The hook 36 was pulled up so as to keep the free end 34a of the tube 34 surely above and spaced from the liquid surface 15 in the vessel 24.

Then the vacuum pump 40 was operated to reduce the pressure in the chamber 20 to the extent of about 0.1 Torr (this is not limitative: the reduced pressure may range from 0.1 to 3.0 Torr, and preferably from 0.1 to 1.2 Torr), and $N_2$ gas (or an alternative inactive gas such as Ar or Ne) was introduced into the chamber 20 through the pipe 52 and was purged from the chamber 20 by re-operating the vacuum pump 40. This procedure was repeated several times to thereby completely discharge air from the chamber 20.

While the nitrogen gas pressure in the chamber 20 was kept at about 0.1 Torr, the hook 36 was lowered to submerge the free end 34a of the tube 34 in the electrolyte solution 14 in the vessel 24.

After that the support 30 of the vessel 24 was raised so as to render the liquid surface 15 higher than the level of the solution 14 in the ECD cell 10 by about 10 cm (this distance is variable depending on some factors including the size of the cell 10 and the spacing between the two substrates of the cell 10). The hook 36 holding the tube 34 too was moved correspondingly to the movement of the vessel 24.

Nearly simultaneously with such adjustment of the level of the liquid surface 15, introduction of $N_2$ gas into the chamber 20 was reopened to thereby inject the electrolyte solution 14 in the vessel 24 into the cell 10 through the pipe 34. As the cell 10 was nearly completely filled with the electrolyte solution 14, the nitrogen gas pressure in the chamber 20 and the level of the liquid surface 15 in the vessel 24 were regulated so as to keep the distance between the front and back substrates of the cell 10 undecreased and, possibly, slightly enlarged in a central region of the cell 10. That is, care was taken not to cause concaving distortion of the cell substrates and to possibly permit very slight bulging of the cell substrates.

After filling the cell 10 with the electrolyte solution 14 in the above described manner, the cell 10 was taken out of the chamber 20 keeping the inlet opening 12 at the uppermost position, and the cell 10 was placed on a flat and smooth surface of a plate (e.g. glass plate) to check the flatness or bulging of the cell substrates by utilizing the dead load of the cell 10. When the cell substrates were bulgy, the cell 14 was left resting on the plate for a short time to thereby allow the cell substrates to resume parallelism.

After that the silicone tube 34 was detached from the inlet opening 12 of the cell 10, and the inlet opening 12 was closed with a plug made of alkaliless glass and completely sealed with butyl rubber.

Ten samples of the same ECD device cell 10 were filled with the electrolyte solution 14 by the above described method under the same conditions. After closing and sealing the inlet opening 12, bubbles were found in none of the ten samples. In every aspect these ten samples of the ECD device were all acceptable as commercial products.

COMPARATIVE EXAMPLE

The ECD device cell 10 described in the foregoing Example was filled with the electrolyte solution 14 by a known method not in accordance with the present invention.

A vessel containing the electrolyte solution 14 was placed at the bottom of a chamber, and the cell 10 was held in that chamber in such a position and in such a posture that the inlet opening 12 was in the lowermost section of the cell 10 and was above the level of the electrolyte solution in the vessel. In that state air was purged from the chamber by operating a vacuum pump, and then $N_2$ gas was introduced into the chamber and subsequently purged from the chamber to create a high vacuum in the chamber. Then the ECD device cell 10 was lowered to submerge the inlet opening 12 in the electrolyte solution. After that, $N_2$ gas was introduced into the chamber to produce a pressure difference between the inactive gas atmosphere in the chamber and the isolated interior of the display device cell 10. As a result the electrolyte solution was forced to flow into the cell 10. After filling the cell 10 with the electrolyte solution the cell 10 was taken out of the chamber, and the inlet opening 12 was closed and sealed.

By this method ten samples of the ECD device cell 10 were filled with the electrolyte solution. After closing and sealing the inlet opening 12, bubbles were found in five samples. In the remaining five samples the front and back substrates of the cell had been concavingly distorted. Consequently, none of the ten samples were acceptable as commercial products.

What is claimed is:

1. A method of injecting a liquid into a display device cell having an inlet opening, the method comprising the steps of:
   (a) connecting one end of the tube to said inlet opening of the display device cell and placing a vessel containing said liquid and the cell in a chamber such that said inlet opening is in an uppermost section of the cell, the other end of said tube being left open to the atmosphere in said chamber;
   (b) replacing air present in said chamber by an inactive gas and thereafter purging said inactive gas from said chamber to thereby create a vacuum in said chamber; and
   (c) after step (b) submerging said other end of said tube in said liquid in said vessel and introducing an inactive gas into said chamber while controlling the rae of a rise in the gas pressure in said chamber up to the atmospheric pressure to thereby control the rate of injection of said liquid into the cell through said tube and varying the level of a surface of said liquid in said vessel so as to keep said level of the liquid susrface in said vessel higher than the level of a surface of said liquid within the cell.

2. A method according to claim 1, wherein the cell is moved in a vertical direction at step (c).

3. A method according to claim 1, wherein the magnitude of said vacuum at step (b) is in the range from about 0.1 Torr to about 3.0 Torr.

4. A method according to claim 1, wherein said liquid is a liquid crystal.

5. A method according to claim 1, wherein said liquid is an electrolyte solution.

6. An apparatus for injecting a liquid into a display device cell having an inlet opening, the apparatus comprising:
   a chamber provided with means for purging gases from the chamber, means for introducing an inactive gas into the chamber and means for introducing said liquid into the chamber;
   a rest which is disposed in said chamber and on which the display device cell can be placed in such a posture that said inlet opening is in an uppermost section of the cell;
   a support which is disposed in said chamber and on which a vessel for receiving and retaining said liquid introduced into said chamber is placed, said support being spaced apart from said rest in a lateral direction such that said support and said rest are not vertically aligned; and
   means for moving said support upward and downward;
   a tube which is to be connected at its one end to said inlet opening of the cell and can be submerged at the other end in said liquid contained in said vessel, at least a portion of said tube extending in a substantially non-vertical direction; and
   means for holding said tube and moving said tube upward and downward.

7. An apparatus according to claim 6, further comprising means for moving said rest upward and downward.

* * * * *